US009428269B1

(12) United States Patent
Oppenheimer et al.

(10) Patent No.: US 9,428,269 B1
(45) Date of Patent: Aug. 30, 2016

(54) METHODS AND APPARATUS TO ACHIEVE INDEPENDENT SIX DEGREE CONTROL OF FLAPPING WING MICRO AIR VEHICLE

(71) Applicant: The United States of America as represented by the Secretary of the Air Force, Washington, DC (US)

(72) Inventors: Michael W Oppenheimer, Beavercreek, OH (US); Isaac E Weintraub, Fairborn, OH (US); David O Sigthorsson, Beavercreek, OH (US); David B Doman, Springfield, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 128 days.

(21) Appl. No.: 14/595,473

(22) Filed: Jan. 13, 2015

(51) Int. Cl.
*B64C 33/02* (2006.01)

(52) U.S. Cl.
CPC .................. *B64C 33/025* (2013.01)

(58) Field of Classification Search
CPC .................................... B64C 33/025
See application file for complete search history.

(56) References Cited

PUBLICATIONS

Deng et al., IEEE Transactions on Robotics, Flapping Flight for Biomimetic Robotic Insects: Part II—Flight Control Design, Aug. 2006, vol. 22, No. 4.
Doman et al., 48th AIAA Aerospace Sciences Meeting Including the New Horizons Forum and Aerospace Exposition, Dynamics and Control of a Biomimetic Vehicle Using Biased Wingbeat Forcing Functions: Part II—Controller, Jan. 2010.
Doman et al., Journal of Guidance, Control, and Dynamics, Wingbeat Shape Modulation for Flapping-Wing Micro-Air-Vehicle Control During Hover, May-Jun. 2010, vol. 33, No. 3.
Doman et al., AIAA Guidance, Navigation, and Control Conference, Dynamics and Control of a Minimally Actuated Biomimetic Vehicle: Part I—Aerodynamic Model, Aug. 10-13, 2009.
Han et al., Health Monitoring of Structural and Biological Systems, Bio-inspired Flapping UAV Design: A University Perspective, 2009, vol. 7295.
Oppenheimer et al., Journal of Guidance, Control, and Dynamics, Dynamics and Control of a Biomimetic Vehicle Using Biased Wingbeat Forcing Functions, Feb. 2011, vol. 34, No. 1.
Oppenheimer et al., 48th AIAA Aerospace Sciences Meeting Including the New Horizons Forum and Aerospace Exposition, Dynamics and Control of a Biomimetic Vehicle Using Biased Wingbeat Forcing Functions: Part I—Aerodynamic Model, Jan. 3-7, 2010.

(Continued)

*Primary Examiner* — Christopher P Ellis
*Assistant Examiner* — Jessica Wong
(74) *Attorney, Agent, or Firm* — AFMCLO/JAZ; Jason Sopko (57) ABSTRACT

A method of configuring a wing velocity profile includes segmenting a complete wingbeat cycle into a set of quarter-strokes including a first quarter-stroke, a second quarter-stroke, a third quarter-stroke, and a fourth quarter-stroke. The method further includes generating time-varying quarter-stroke wing position commands for each of a first and second wing planforms to produce wing flapping trajectories that generate non-zero, cycle averaged wing lift and drag and alter a cycle average center of pressure of each of the first and the second wing planforms relative to the aircraft. The wing position commands include velocities and positions with temporally symmetric and asymmetric quarter-stroke components for the first wing planform and the second wing planform. The first wing planform and the second wing planform produce controlled six-degrees-of freedom vehicle motion without using actuators in excess of the first actuator and the second actuator.

3 Claims, 8 Drawing Sheets

(56) References Cited

PUBLICATIONS

Oppenheimer et al., AIAA SciTech, Quarter Cycle Modulation of a Minimally Actuated Biomimetic Vehicle, Jan. 13-17, 2014.

Oppenheimer et al., Journal of Guidance, Control, and Dynamics, Control of a Minimally Actuated Biomimetic Vehicle Using Quarter-Cycle Wingbeat Modulation.

Oppenheimer et al., AIAA Guidance, Navigation, and Control Conference, Dynamics and Control of a Minimally Actuated Biomimetic Vehicle: Part II—Control, Aug. 10-13, 2009.

Schenato et al., Proceedings of the 2001 IEEE International Conference on Robotics & Automation, Flight Control System for a Micromechanical Flying Insect: Architecture and Implementation, May 21-26, 2001.

Schenato et al., Proceedings of the 42nd IEEE Conference on Decision and Control, Controllability issues in flapping flight for biomimetic Micro Aerial Vehicles (MAVs), Dec. 2003.

Wood, IEEE Transactions on Robotics, The First Takeoff of a Biologically Inspired At-Scale Robotic Insect, Apr. 2008, vol. 24, No. 2.

Fig. 8

METHODS AND APPARATUS TO ACHIEVE INDEPENDENT SIX DEGREE CONTROL OF FLAPPING WING MICRO AIR VEHICLE

RIGHTS OF THE GOVERNMENT

The invention described herein may be manufactured and used by or for the Government of the United States for all governmental purposes without the payment of any royalty.

FIELD OF THE INVENTION

The present invention relates generally to aircraft and, more particularly, to biomimetic aircraft having insect-like features and maneuverability.

BACKGROUND OF THE INVENTION

Flapping wing micro air vehicles (FWMAV) have received a great deal of interest in the research community in the past decade. Researchers have developed and designed FWMAVs using numerous innovative materials and manufacturing techniques.

Control laws have been developed to govern the operation of flapping wing vehicles. Some designs use averaging theory to parameterize the varying wing kinematics on the vehicle forces and moments. This control strategy required at least four actuators. In those designs, two actuators were used to actively control the angle-of-attack, and two were required to drive each wing in the stroke plane. Other designs used a similar time-averaged approach to develop a longitudinal flight controller for a flapping-wing micro air vehicle. The control law was written in terms of the aerodynamic forces averaged over one wing-beat cycle. It was assumed that the mean forces could be controlled as desired; however, the relationships between the mean-aerodynamic forces and the wing kinematic parameters were not established. The Nano Hummingbird is an example of an operational flapping wing vehicle and control law that utilized three actuators.

A split-cycle constant period frequency modulation technique independently controls four degrees-of-freedom (DOF) with two physical actuators. By adding a bob-weight and third actuator, it is possible to independently control five DOF. The split-cycle technique may be modified to include a wing bias that provides independent five DOF control with only two physical actuators. It should be noted that the two actuator/five DOF technique is only applicable to configurations using actuators that are capable of being biased, such as piezoelectric devices, and is not applicable to direct current motor actuators.

Given that power to weight ratio is a critical element in FWMAV design, it is desirable to enable control over the greatest possible number of DOFs using the fewest actuators. One technique that has been proposed by researchers for controlling a FWMAV is split-cycle constant-period frequency modulation (SCCPFM). In this technique, each wing's upstroke and downstroke can have different velocities, resulting in the ability to generate non-zero cycle averaged drag forces. These drag forces provide the ability to control the fore/aft translation, roll, and pitch degrees-of-freedom of the vehicle. Unfortunately, by using this technique, it is not possible to generate fore/aft translation independent from pitch commands. Non-zero cycle averaged lift can also be produced by the wings, allowing control over the vertical and yaw degrees of freedom. Therefore, by utilizing SCCPFM, four independent degrees-of-freedom of the vehicle can be controlled.

As a result, there exists a need for an FWMAV activation and control method capable of yielding control over 6 independent DOFs.

SUMMARY OF THE INVENTION

The present invention overcomes the foregoing problems and other shortcomings, drawbacks, and challenges of requiring additional actuators to achieve all possible degrees of aircraft maneuverability. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention in an aircraft including a first wing planform and a second wing planform driven by a corresponding first actuator and a corresponding second actuator, wherein each of the first wing planform and the second wing planform performs an upstroke and a downstroke over a complete wingbeat cycle, a method of configuring a wing velocity profile is provided. The method includes segmenting the complete wingbeat cycle into a set of quarter-strokes including a first quarter-stroke, a second quarter-stroke, a third quarter-stroke, and a fourth quarter-stroke. The method further includes generating time-varying quarter-stroke wing position commands for each of the first and second wing planforms to produce wing flapping trajectories that generate non-zero, cycle averaged wing lift and drag and alter a cycle average center of pressure of each of the first and the second wing planforms relative to the aircraft. The wing position commands include velocities and positions, with temporally symmetric and asymmetric quarter-stroke components, for the first wing planform and the second wing planform. The first wing planform and the second wing planform produce controlled six-degrees-of freedom vehicle motion without using actuators in excess of the first actuator and the second actuator.

Additional objects, advantages, and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The disclosed invention, includes a novel FWMAV and a method of control thereof, that enables independently controlled six degree-of-freedom flight of the fuselage of a flapping wing vehicle. The disclosed invention operates without the need for artificial motion constraints, and may do so with as few as two actuators.

Figure 1:
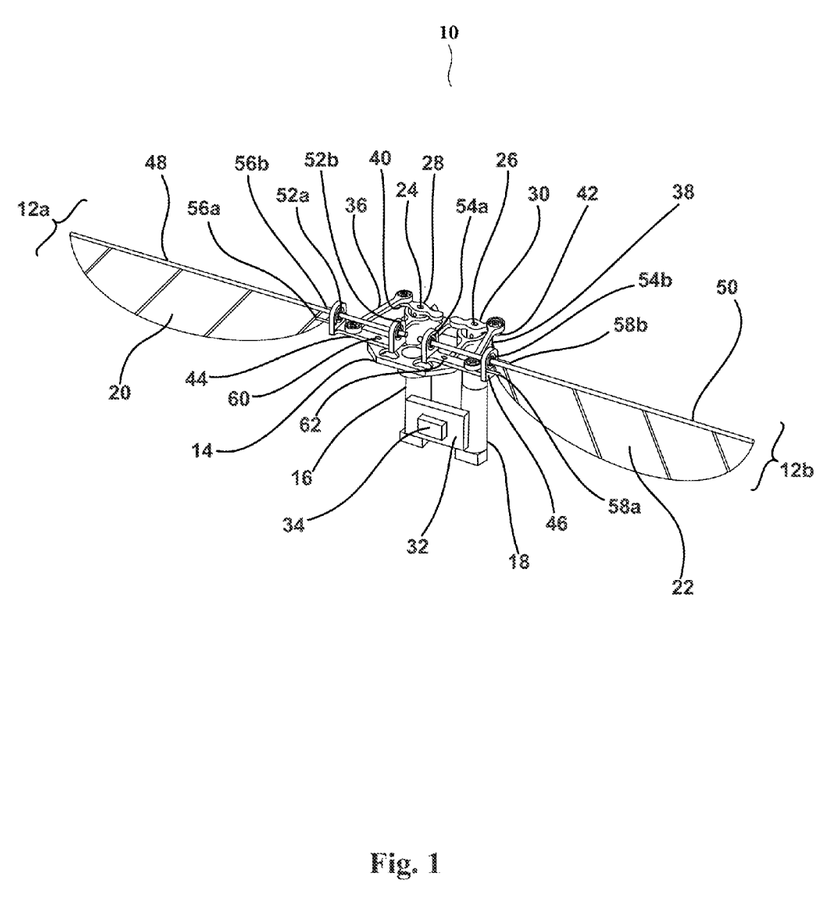
FIG. 1 is an illustration depicting an apparatus suitable for being controlled according to embodiments of the disclosed invention.

Turning attention to FIG. 1, the aircraft 10 includes independently actuated wings 12a and 12b whose position and velocity profiles can be manipulated to generate controllable forces and moments that enable the aircraft to achieve insect-like maneuverability and hover capability. As discussed herein, components listed on the left side of FIG. 1 shall be referred to as "first" while components on the right hand side shall be referred to as "second." Further, components denoted "second" correspond to the left side of the aircraft 10, and conversely with respect to "first." A fuselage 14 includes a first and second brushless direct current (BLDC) motor, 16 and 18, respectively, mated thereto. First BLDC motor 16 is the prime mover for first wing planform 20, while second BLDC motor 18 is the prime mover for second wing planform 22. Each of BLDC motor 16 and 18 include a corresponding first output shaft 24 and second output shaft 26. First output shaft 24 is mated to first crank 28, while the second output shaft 26 is attached to second crank 30. Electrical potential is provided by the output of a control board 32 powered by a power supply 34. In some embodiments, the power supply 34 may be onboard, while in other embodiments the power supply may be located remotely. The control board 32 receives input wingbeat position profile commands and provides a corresponding electrical commutation signal to each BLDC motor 16 and 18. The rotary motion of BLDC motors 16 and 18 cause rotary motion of cranks 28 and 30. In some embodiments gearing, pulleys, or the like may be used at various points throughout the mechanism to scale input and output angular velocities and torques. A first connecting rod 36 operably interconnects a first lobe 40 of the first crank 28 to a first rocker 44. Likewise, a second connecting rod 38 operably interconnects a second lobe 42 of the second crank 30 to a second rocker 46. Rotation of cranks 28 and 30 cause connecting rods 36 and 38 to move along a sector of a circle, which causes rockers 44 and 46 to oscillate. This provides the back and forth, or flapping motion, of wings 12a and 12b. Rockers 44 and 46 may be cantilevered with respect to the fuselage 14 and provide attachment points for first wing spar 48 and second wing spar 50. The first wing spar 48 is attached to the first rocker 44 such that the first wing planform 20 can passively rotate about the longitudinal axis of the first wing spar 48 to provide nonzero angle of attack with respect to the stroke plane of the first wing planform 20. The stroke plane of the first wing spar 48 is in a plane that includes the first crank 28, first connecting rod 36, and first rocker 44. Similarly, the stroke plane of the second wing spar 50 is in a plane that includes the second crank 30, second connecting rod 38, and second rocker 46.

In furtherance of the passive rotation operation noted above, the second wing spar 50 is attached to the second rocker 46 by passing the circular cross-section of the second wing spar 50 through a second ball bearing 54a and 54b. An interference joint is established such that, when wing 12 flapping occurs, the second wing planform 22 rotates and impacts the second wing fixed angle of attack stop 58a, such that a prescribed wing angle of attack, a, is achieved. As shown, the wing is at 90° angle of attack. Likewise, when the second wing planform 22 is flapping in the opposite direction, the second wing planform 22 rotates and impacts the corresponding second fixed angle of attack stop 58b, such that a prescribed wing angle of attack is achieved. Second fixed angle of attack stops 58a and 58b interfere with the second wing planform 22 at an angle $\alpha$, selected by the designer, and prevents the second wing planform 22 from over rotating. Interference between the second wing planform 22 and the second wing fixed angle of attack stops 58a and 58b causes the wing 12b to hold a constant angle of attack relative to the stroke plane once a sufficient dynamic pressure is reached. The same operation holds true for the interaction between the first wing planform 20, first ball bearings 52a and 52b, first fixed angle of attack stops 56a and 56b, but is reflected about the fuselage 14.

The aircraft 10 is designed to be controlled and maneuvered in the vicinity of hover and, for the purposes of analysis, the local velocity of the wind relative to the wing planform 20 or 22 is taken to be V=rip, where r is the distance from the rocker pivot points 60 or 62 of the wing spar 48 or 50 to an arbitrary chord line on the wing planform 20 or 22, $\phi$ is the angular position of the wing planform 20 or 22, and is the time derivative of the wing planform 20 or 22 angular position.

Figure 2:
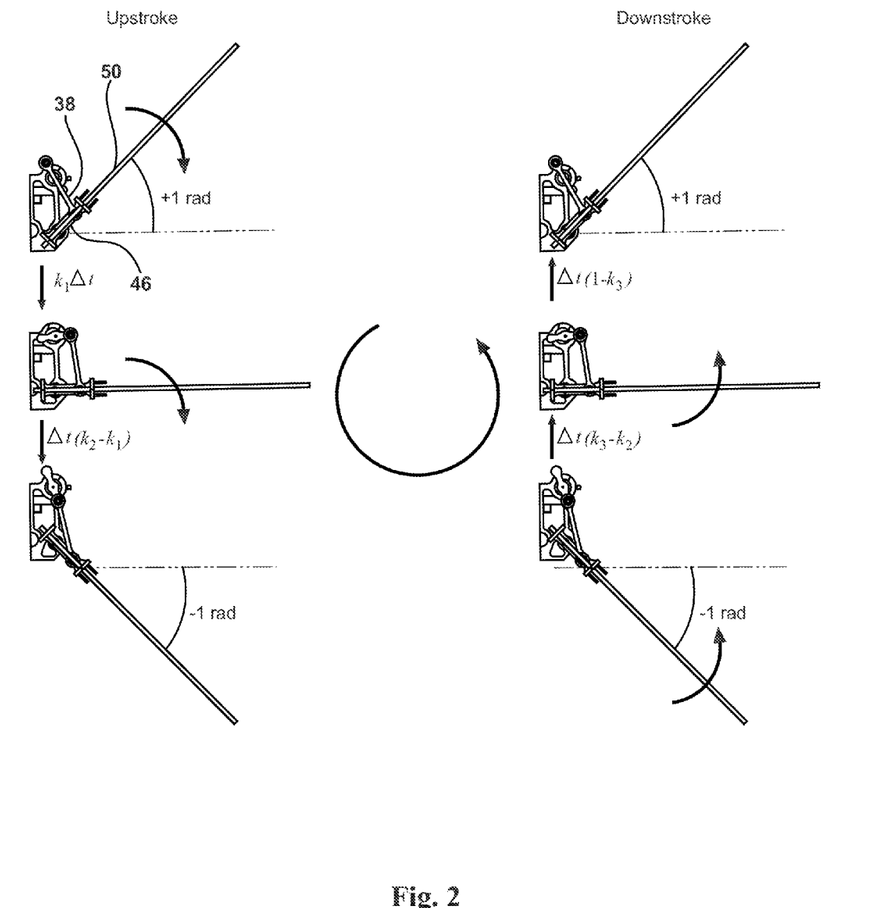
FIG. 2 is an illustration depicting the apparatus of FIG. 1 in several stopped motion flapping segments.

FIG. 2 shows a top view of the aircraft 10, with only part of the mechanism shown (notably, the second connecting rod 38 and second rocker 46) along with the second wing spar 50. This figure is to be read in a counterclockwise fashion, starting from the upper left corner (which represents the beginning of the upstroke). Second wing spar 50 starts at an angular position of 1 rad, measured from the horizontal, and moves, over a time period of $k_1 \Delta t$, to the midpoint angular position of 0 rad, where $\Delta t$ is the fundamental period of one complete wingbeat cycle. Following this, second wing spar 50 moves over a time period of $\Delta t (k_2-k_1)$ to an angular position of −1 rad. At this point, the upstroke ends and the downstroke begins. During the downstroke, second wing spar 50 moves from an angular position of −1 rad to 0 rad over a time period of $\Delta t (k_3-k_2)$, then moves from 0 rad angular position to 1 rad angular position over a time period of Δt (1−$k_3$). This completes the downstroke and another upstroke begins. The motion shown in FIG. 2 comprised one complete wingbeat cycle.

In the discussion that follows, it should be noted that variations may be made to the mechanism of the aircraft 10, to the prime movers (i.e., BLDC motors 16 and 18), or fixed angle of attack stops 56a, 56b, 58a, or 58b. The physical aircraft 10 apparatus shown herein is intended to provide a frame-of-reference to describe various disclosed methods for controlling the wings 12a and 12b so as achieve six DOF control of the aircraft. It should be noted that some embodiments of the disclosed invention may employ reconfigurable versions of the fixed angle of attack stops 56a, 56b, 58a, or 58b. In such reconfigurable embodiments, the angle stops may be relocated in one of a plurality of alternate locations by placing pins or threaded members into bores. Likewise, the angle stops may slide within an arcuate track, and thereafter be clamped into a desired location. Further, automated means may be employed to change the position of the angle of attack stops 56a, 56b, 58a, 58b so as to provide dynamic adjustments of the angle of attack stop 56a, 56b, 58a, 58b positions while in active flight, or to accommodate different flight configurations.

Control of the aircraft 10 is achieved by independently driving actuators (BLDC motors 16 and 18 or other prime mover) so that specifically designed angular displacements of rockers 44 and 46 in the stroke plane occur. In order for each wing 12 to produce independently controlled cycle-averaged body forces in both the vertical and horizontal directions, wherein the angle of attack of each wing 12 is passively regulated by the interference joints and fixed angle of attack stops 56a, 56b, 58a, and 58b previously described, the wing 12 velocities must be temporally asymmetric over the wingbeat cycle. In the disclosed invention, this is accomplished by parameterizing the waveforms that define the motion of each wing 12 in the stroke-plane in terms of four components. The method may be referred to as Quarter-Cycle Constant-Period Frequency Modulation. It is assumed that the position of the wing can be described by a triangular waveform.

The quarter-cycle constant period frequency modulation method includes piecing together triangular waves of different frequencies over one complete wing beat cycle such that the resulting waveform is continuous in position at all transition points. Each wingbeat cycle consists of four strokes, namely, first, second, third, and fourth quarter-strokes. The period of the cycle is fixed by the symmetric or fundamental frequency, while the speed of each stroke within the cycle is governed by three additional quarter-cycle parameters. The nominal waveform is symmetric such that each quarter-stroke operates over identically ¼ of the fundamental period. With quarter-cycle constant period frequency modulation, each quarter-stroke can occur over a longer or shorter period than nominal, provided that the overall cycle period equals the given fundamental period. Quarter-cycle modulation allows one to change the duration of each quarter-stroke to a value different than ¼ of the fundamental period, which provides the ability to independently control all six rigid body degrees-of-freedom.

In order to describe the quarter-cycle frequency modulation technique, a symmetric waveform is first described, followed by an example of a split-cycle waveform, and lastly a quarter-cycle waveform. In the waveform examples, it is assumed that the period of a full wingstroke cycle is 1 sec, the amplitude of wing motion is 1 rad, and the wingstroke starts at 0 sec. Additionally, it is assumed that the wing position waveforms are triangular waves, but could be replaced by a different waveform if desired. Two independently generated waveforms define the motion of the first wing planform 20 and second wing planform 22.

Figure 3:
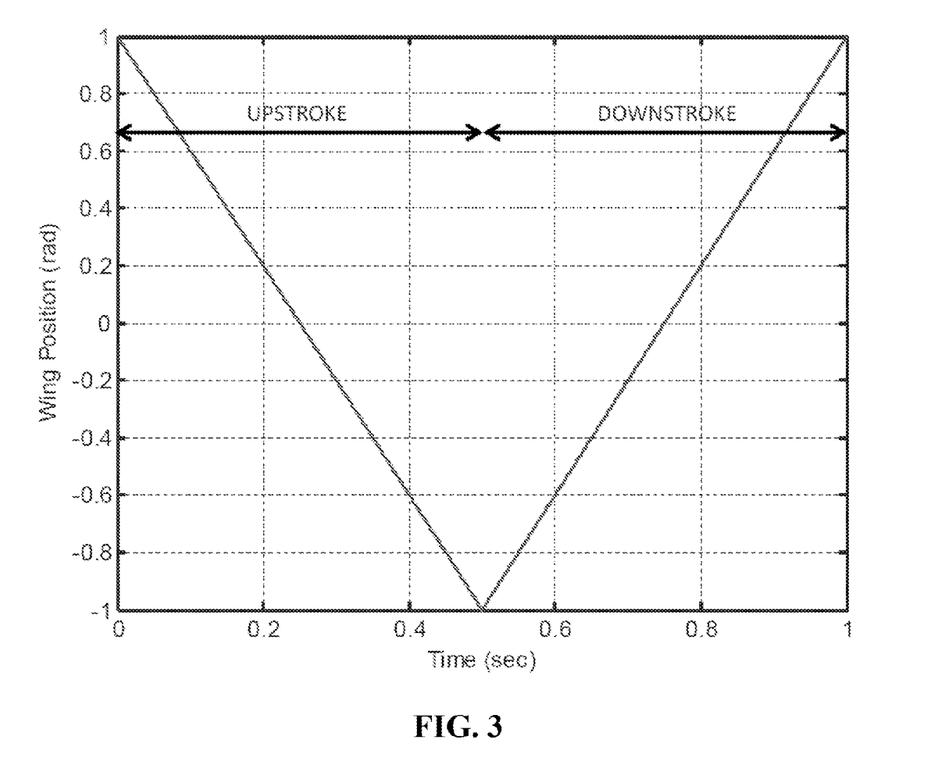
FIG. 3 is a graphical representation of a flapping motion having symmetric upstroke and downstroke elements.

In the following figures, only a single waveform is shown, but it should be understood that this waveform could apply to either the first wing planform 20 or second wing planform 22. A symmetric waveform has an upstroke and downstroke that each comprise exactly ½ of a wingstroke period. FIG. 3 shows a symmetric waveform. Here, the velocities of the wing during the upstroke and downstroke are identical in magnitude and opposite in sign.

Figure 4:
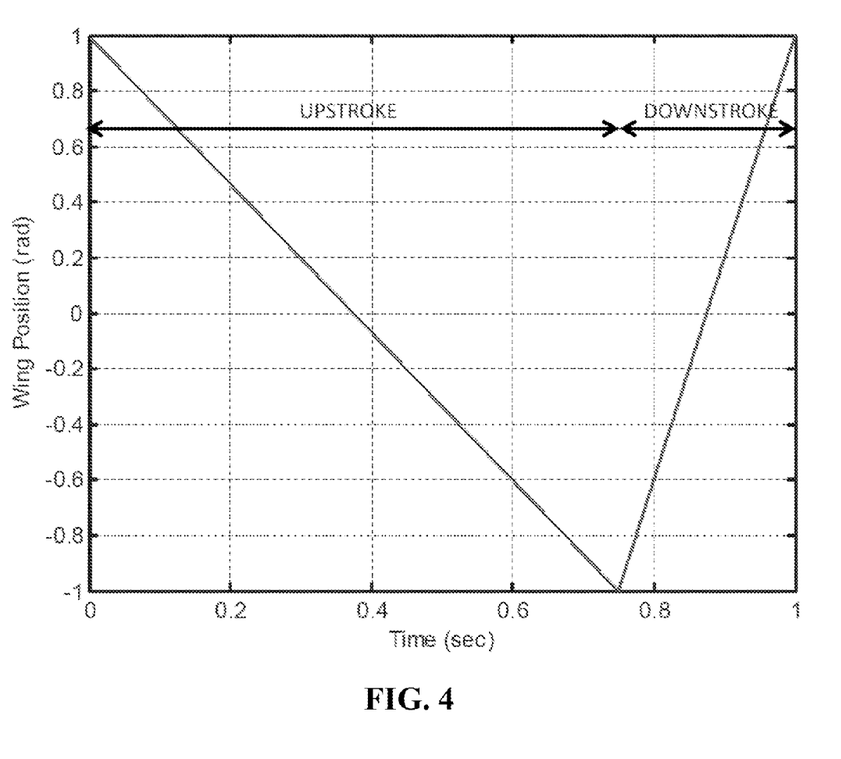
FIG. 4 is graphical representation of a split-cycle flapping motion having asymmetric upstroke and downstroke elements.

A split-cycle waveform allows modulation of the portions of the wingstroke period that are occupied by the upstroke and downstroke. An example split-cycle waveform is shown in FIG. 4. In this example, the upstroke is retarded while the downstroke is advanced. Therefore, the magnitude of the wing 12 velocity during the upstroke will be less than the magnitude of the wing 12 velocity during the downstroke. The split-cycle parameter defines when the upstroke ends and the downstroke begins, while the frequency determines the period of the wingstroke (set to 1 sec in this example). Hence, there are two split-cycle control parameters that control the durations of the upstroke and downstroke within a period (one for each of the first and second wings) and two symmetric frequencies that set the period of the wingstroke (one for each of the first wing planform 20 and second wing planform 22). Thus, split-cycle constant period frequency modulation uses four control parameters and provides independent control of four degrees-of-freedom of the aircraft 10.

Figure 5:
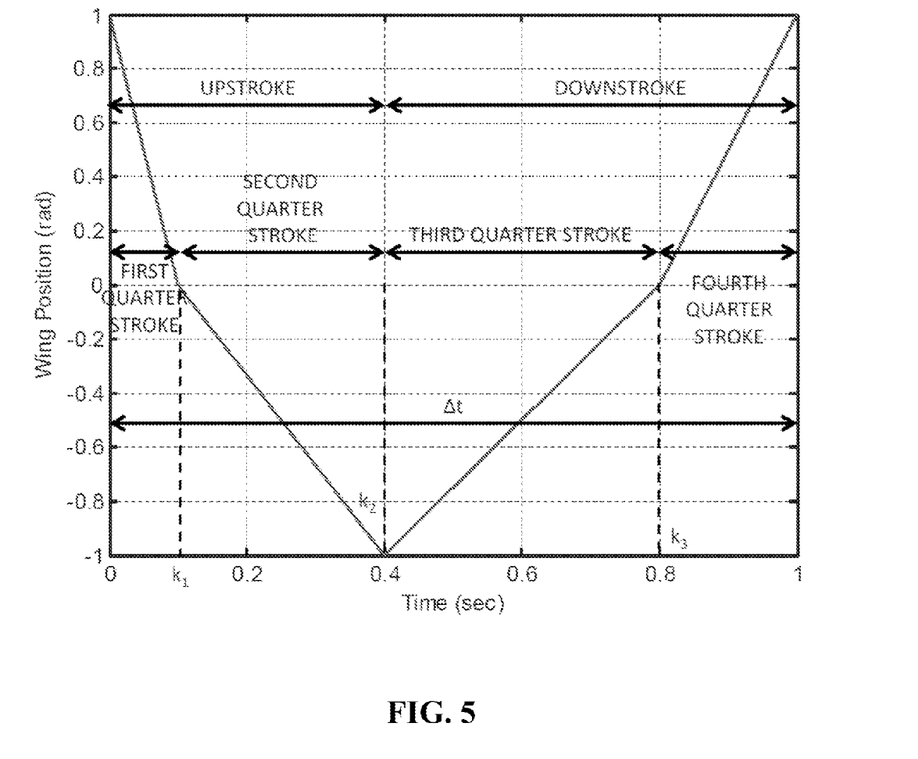
FIG. 5 is a graphical representation of a quarter-cycle flapping motion having two independently adjustable upstroke elements and two independently adjustable downstroke elements.
Figure 6:
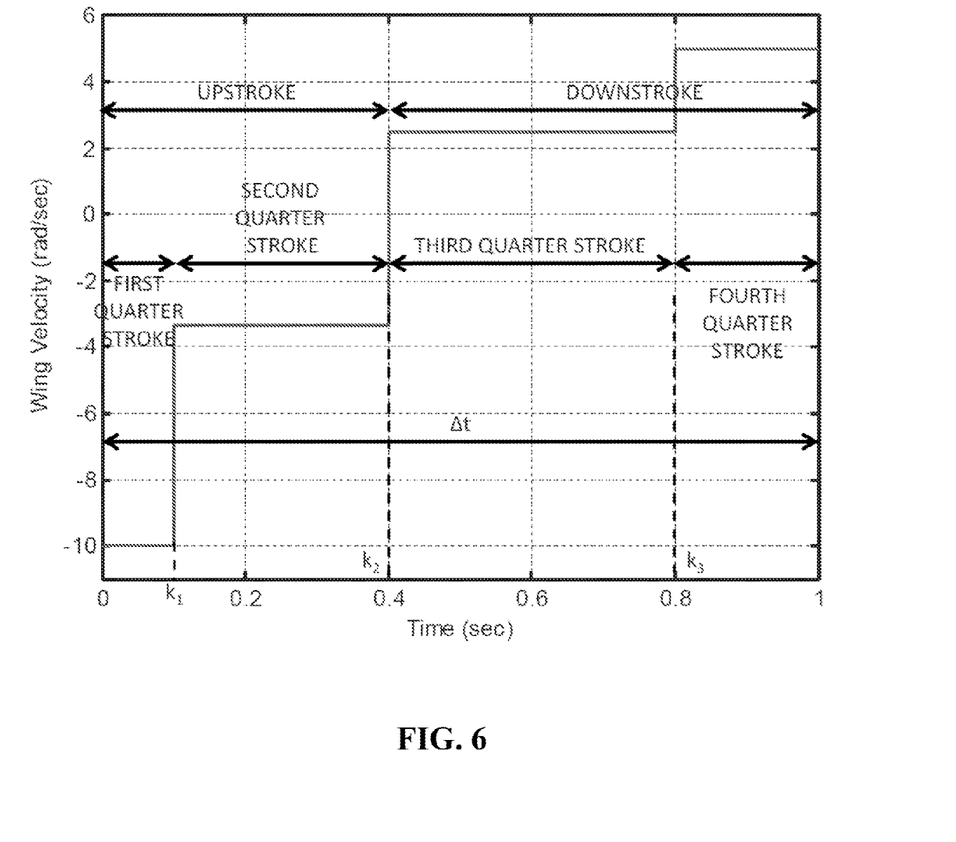
FIG. 6 is a graphical depiction of wing velocity versus time of a quarter-cycle waveform in accordance with embodiments of the disclosed invention.

A quarter-cycle waveform breaks the positions of wings 12a and 12b into four distinct parts for each wing 12a and 12b. FIG. 5 shows a quarter-cycle wing position waveform. In this case, the complete wing position for each wing is described by four distinct parts, namely, the first quarter, second quarter, third quarter, and fourth quarter-strokes. By doing this, the wing velocities during each of the four portions can be varied, as shown in FIG. 6. For a quarter-cycle waveform, there are eight control parameters: two symmetric frequencies that set the period of the wingstroke (one for each of the first wing planform 20 and second wing planform 22), two $k_1$ parameters that define the relative time at which the first quarter-stroke ends (one for each of the first wing planform 20 and second wing planform 22), two $k_2$ parameters that define the relative time at which the second quarter-stroke ends (one for each of the first wing planform 20 and second wing planform 22), and two $k_3$ parameters that define the relative time at which the third quarter-stroke ends (one for each of the first wing planform 20 and second wing planform 22). With eight control parameters, six independent DOF can be controlled with only two physical actuators. It should be noted that the quarter-cycle parameters have theoretical limits of $0<k_1<k_2<k_3'<1$. Additionally, there are other, more constrained limits imposed on these variables by the physical limitations of the prime movers and flapping mechanism.

Each waveform in the quarter-cycle constant period frequency scheme has the following forms:

$$\phi_1(t) = \left(\frac{-t}{k_1 \Delta t} + 1\right) \quad 0 \le t < k_1 \Delta t$$

$$\phi_2(t) = \frac{-1}{\Delta t(k_2 - k_1)}(t - k_1 \Delta t) \quad k_1 \Delta t \le t < k_2 \Delta t$$

$$\phi_3(t) = \frac{1}{\Delta t(k_3 - k_2)}(t - k_2 \Delta t) - 1 \quad k_2 \Delta t \le t < k_3 \Delta t$$

$$\phi_4(t) = \frac{1}{\Delta t(1 - k_3)}(t - k_3 \Delta t) \quad k_3 \Delta t \le t < \Delta t$$

Equation 1 where it is assumed that the amplitude of wing 12 motion is 1 rad, $\Delta t$ is the period of the full cycle wingbeat, and $k_1$, $k_2$, and $k_3$ define the end of each quarter-stroke. Previously, it was assumed that the full cycle period was 1 sec, whereas the full period is now defined by $\Delta t$, which can be value other than 1 sec. Additionally, the amplitude of wing 12 motion is set to 1 rad in this example, but the technique is applicable to any flapping motion amplitude. The time variable, t, in Equation 1 is reset to zero at the beginning of each stroke and has a duration of $\Delta t$ sec. Nominally, for a symmetric waveform, $k_1=\frac{1}{4}$, $k_2=\frac{1}{2}$, and $k_3=\frac{3}{4}$. Equation 1 is a general expression which is not specific to either the first or second wing. In order to make Equation 1 apply to the right wing, simply replace $\Delta t$, $k_1$, $k_2$, $k_3$ by $\Delta t_{RW}$, $k_{RW_1}$, $k_{RW_2}$, $k_{RW_3}$ and for the left wing replace $\Delta t$, $k_1$, $k_2$, $k_3$ by $\Delta t_{LW}$, $k_{LW_1}$, $k_{LW_2}$, $k_{LW_3}$. The parameters that will be used to control the wingbeat positions are the wingstroke periods, $\Delta t_{RW}$, $\Delta t_{LW}$, and the quarter-cycle points, $k_{RW_1}$, $k_{RW_2}$, $k_{RW_3}$, $k_{LW_1}$, $k_{LW_2}$, $k_{LW_3}$.

Hence, there are a total of 8 control parameters. The derivatives of the wing position functions, with respect to time, are:

$$\dot{\phi}_1 = \frac{-1}{k_1 \Delta t}$$
$$\dot{\phi}_2 = \frac{-1}{\Delta t(k_2 - k_1)}$$
$$\dot{\phi}_3 = \frac{1}{\Delta t(k_3 - k_2)}$$
$$\dot{\phi}_4 = \frac{1}{\Delta t(1 - k_3)}$$

Equation 2

Figure 7:
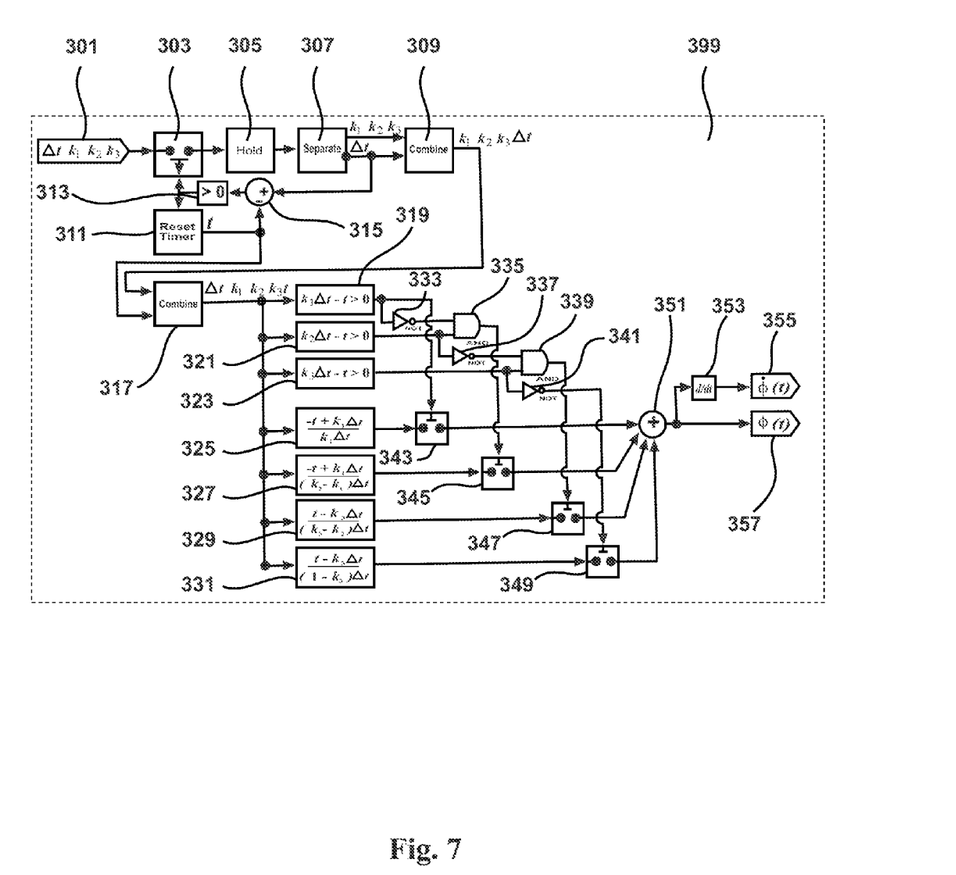
FIG. 7 is a block diagram illustrating components of a wing position waveform generator in accordance with embodiments of the disclosed invention.

The general block diagram that describes the generation of the wingbeat command profile is shown in FIG. 7. Note that at the beginning of each upstroke, $\Delta t$, $k_1$, $k_2$, $k_3$ are computed and used to generate the wingbeat commands for each wing. Block 301 provides as input the wingbeat parameters $\Delta t$, $k_1$, $k_2$, $k_3$. A resettable timer 311 provides a time, t, that is used to generate the time varying wing position commands. The time, t, is subtracted from the wingbeat period, $\Delta t$, by summing block 315. Comparator block 313 takes as input $\Delta t-t$ and checks if this value is greater than zero. Comparator block 313 produces a binary output of 1 if $\Delta t-t>0$ and an output of 0 if $\Delta t-t\leq0$. When the output of comparator block 313 transitions from a 1 to a 0, timer block 311 is reset and switch 303 is closed, thus producing another sample of input parameters $\Delta t$, $k_1$, $k_2$, $k_3$. Hold block 305 takes as input the input parameters and holds these values constant until a new vector of input parameters becomes available. Separator block 307 takes as input a vector which contains $\Delta t$, $k_1$, $k_2$, $k_3$ and provides two outputs, a vector with $k_1$, $k_2$, $k_3$ and a scalar signal $\Delta t$. The separation is used to obtain $\Delta t$ so that it can be compared with the current time, t, so that the timer can be reset. Block 309 simply combines its input signals into a single vector. Combine block 317 takes as input a vector signal $\Delta t$, $k_1$, $k_2$, $k_3$ and a scalar time, t, and provides a single vector signal output of $\Delta t$, $k_1$, $k_2$, $k_3$, t. Comparator block 319 outputs a binary value of 1 if $k_1\Delta t-t>0$ and a value of 0 if $k_1\Delta t-t\leq0$. This determines whether or not the current time is contained in the first quarter-stroke. Comparator block 321 outputs a binary value of 1 if $k_2\Delta t-t>0$ and a value of 0 if $k_2\Delta t-t\leq0$. This determines whether or not the current time is contained in the first or second quarter-strokes. Comparator block 323 outputs a binary value of 1 if $k_3\Delta t-t>0$ and a value of 0 if $k_3\Delta t-t\leq0$. This determines whether or not the current time is contained in the first, second, or third quarter-strokes. When the output of comparator block 319 is high, switch 343 is closed. Block 325 generates the wingbeat command profile for the first quarter-stroke and is an input to summing block 351. When switch 343 is open, a first quarter-stroke value of zero is input to summing block 351. NOT gate 333 takes as input the output of comparator 319 and produces a binary signal of 1 if $k_1\Delta t-t\leq0$ and a value of 0 if $k_1\Delta t-t>0$. AND gate 335 takes as input the outputs of NOT gate 333 and comparator block 321. The output of AND gate 335 is a binary signal of 1 when the current time is contained in the second quarter-stroke and a value of 0 otherwise. When the output of AND gate 335 is high, switch 345 is closed. Block 327 generates the wingbeat command profile for the second quarter-stroke and is an input to summing block 351. When switch 345 is open, a second quarter-stroke value of zero is input to summing block 351. NOT gate 337 takes as input the output of comparator 321 and produces a binary signal of 1 if $k_2\Delta t-t\leq0$ and a value of 0 if $k_2\Delta t-t>0$. AND gate 339 takes as input the outputs of NOT gate 337 and comparator block 323. The output of AND gate 339 is a binary signal of 1 when the current time is contained in the third quarter-stroke and a value of 0 otherwise. When the output of AND gate 339 is high, switch 347 is closed. Block 329 generates the wingbeat command profile for the third quarter-stroke and is an input to summing block 351. When switch 347 is open, a third quarter-stroke value of zero is input to summing block 351. NOT gate 341 takes as input the output of comparator 323 and produces a binary signal of 1 if $k_3\Delta t-t\leq0$ and a value of 0 if $k_3\Delta t-t>0$. When the output of NOT gate 341 is high, the current time is contained in the fourth quarter-stroke and switch 349 is closed. Block 331 generates the wingbeat command profile for the fourth quarter-stroke and is an input to summing block 351. When switch 349 is open, a fourth quarter-stroke value of zero is input to summing block 351. Summing block 351 takes as inputs the first, second, third, and fourth quarter-stroke wingbeat commands and adds them together to produce the desired wingbeat command, $\phi(t)$, in block 357. Differentiator block 353 differentiates the wingbeat command signal with respect to time, producing $\dot{\phi}(t)$ in block 355. Two instances of waveform generator 399 are contained in control board 32 (one for the first wing planform 20 and one for the second wing planform 22). The wings' position commands are converted to BLDC motor commutation sequences by control board block 32 (see FIG. 1) and are applied to BLDC motor 16 if generating a position command for the first wing planform 20 or are applied to BLDC motor 18 if generating a position command for the second wing planform 22. The elements contained in the waveform generator 399 ensure continuity of the wingbeat position commands at all times. The sample, hold, and logic elements prevent the waveform generator from responding to high frequency variations in the control system commands that can distort the waveforms in inter-cycle.

The general method used to compute the cycle-averaged aerodynamic forces and their sensitivities to variations in the control input parameters is presented below. Define G(t) to be a generalized force aligned with a principal body-axis direction that may represent either a force or a moment. In order to compute the cycle-averaged generalized force associated with each wing, an integral of the following form is evaluated:

$$\overline{G} = \frac{1}{\Delta t}\int_0^{\Delta t} G(t)dt \quad \text{Equation 3}$$

where the overline notation, i.e. $\overline{G}$, denotes a cycle averaged quantity. Since the introduction of the quarter cycle parameters change the triangular waveform at the points $k_1\Delta t$, $k_2\Delta t$, $k_3\Delta t$, it is convenient to split the integral as follows:

$$\overline{G} = \frac{1}{\Delta t}\int_0^{\Delta t} G(t)dt = \quad \text{Equation 4}$$
$$\frac{1}{\Delta t}\left(\int_0^{k_1\Delta t} G_1(t)dt + \int_{k_1\Delta t}^{k_2\Delta t} G_2(t)dt + \int_{k_2\Delta t}^{k_3\Delta t} G_3(t)dt + \int_{k_3\Delta t}^{\Delta t} G_4(t)dt\right).$$

where $G_1(t)$, $G_2(t)$, $G_3(t)$, $G_4(t)$ denote generalized forces for the first, second, third, and fourth quarter-strokes.

The control derivatives associated with a generalized cycle-averaged force are calculated by computing the partial derivative of G with respect to each control input variable about the hover condition. At hover, the average lift over a complete wingbeat cycle is equal to the vehicle's weight, while the average sideforce, drag, rolling moment, pitching moment, and yawing moment over a complete wingbeat cycle arezero. At the hover condition, $k_1=\frac{1}{4}$, $k_2=\frac{1}{2}$, $k_3=\frac{3}{4}$, and the wingbeat period is a nominal value, $\Delta t_0$, such that the cycle averaged lift equals the vehicle's weight. The control derivatives are:

$$\left.\frac{\partial \overline{G}}{\partial k_{RW_1}}\right|_{hover}, \left.\frac{\partial \overline{G}}{\partial k_{RW_2}}\right|_{hover}, \left.\frac{\partial \overline{G}}{\partial k_{RW_3}}\right|_{hover}, \left.\frac{\partial \overline{G}}{\partial \Delta t_{RW}}\right|_{hover} \quad \text{Equation 5}$$

-continued $$\left.\frac{\partial \overline{G}}{\partial k_{LW_1}}\right|_{hover}, \left.\frac{\partial \overline{G}}{\partial k_{LW_2}}\right|_{hover}, \left.\frac{\partial \overline{G}}{\partial k_{LW_3}}\right|_{hover}, \left.\frac{\partial \overline{G}}{\partial \Delta t_{LW}}\right|_{hover}$$

These derivatives or sensitivities are used as design parameters for the control system for the aircraft.

The control derivatives are utilized in a control effectiveness matrix that provides information on how changes in the control variables affect the cycle averaged forces and moments. This matrix formulation is as follows:

$$\begin{bmatrix} \overline{X}_{des} \\ \overline{Y}_{des} \\ \overline{Z}_{des} \\ \overline{RM}_{des} \\ \overline{PM}_{des} \\ \overline{YM}_{des} \end{bmatrix} = B \begin{bmatrix} k_{RW_1} \\ k_{RW_2} \\ k_{RW_3} \\ \Delta t_{RW} \\ k_{LW_1} \\ k_{LW_2} \\ k_{LW_3} \\ \Delta t_{LW} \end{bmatrix} = B\delta \quad \text{Equation 6}$$

where $\overline{X}_{des}$ is the desired cycle-averaged vertical force that acts along the x-body axis of the fuselage, $\overline{Y}_{des}$ is the desired cycle-averaged side force acting along the y-body axis of the fuselage, $\overline{Z}_{des}$ is the desired cycle-averaged horizontal force acting along the z-body axis of the fuselage, $\overline{RM}_{des}$ is the desired cycle-averaged rolling moment about the x-body axis of the vehicle, $\overline{PM}_{des}$ is the desired cycle-averaged pitching moment about the y-body axis of the vehicle, and $\overline{YM}_{des}$ is the desired cycle-averaged yawing moment about the z-body axis of the vehicle. These desired body-axes forces and moments are produced by an outer loop control law. In Equation 6, $\delta$ is the control vector given by:

$$\delta = [k_{RW_1} \; k_{RW_2} \; k_{RW_3} \; \Delta t_{RW} \; k_{LW_1} \; k_{LW_2} \; k_{LW_3} \; \Delta t_{LW}]^T \quad \text{Equation 7}$$

and B is the control effectiveness matrix. More specifically, the B matrix is:

$$B = \begin{bmatrix} \frac{\partial \overline{X}}{\partial k_{RW_1}} & \frac{\partial \overline{X}}{\partial k_{RW_2}} & \frac{\partial \overline{X}}{\partial k_{RW_3}} & \frac{\partial \overline{X}}{\partial \Delta t_{RW}} & \frac{\partial \overline{X}}{\partial k_{LW_1}} & \frac{\partial \overline{X}}{\partial k_{LW_2}} & \frac{\partial \overline{X}}{\partial k_{LW_3}} & \frac{\partial \overline{X}}{\partial \Delta t_{LW}} \\ \frac{\partial \overline{Y}}{\partial k_{RW_1}} & \frac{\partial \overline{Y}}{\partial k_{RW_2}} & \frac{\partial \overline{Y}}{\partial k_{RW_3}} & \frac{\partial \overline{Y}}{\partial \Delta t_{RW}} & \frac{\partial \overline{Y}}{\partial k_{LW_1}} & \frac{\partial \overline{Y}}{\partial k_{LW_2}} & \frac{\partial \overline{Y}}{\partial k_{LW_3}} & \frac{\partial \overline{Y}}{\partial \Delta t_{LW}} \\ \frac{\partial \overline{Z}}{\partial k_{RW_1}} & \frac{\partial \overline{Z}}{\partial k_{RW_2}} & \frac{\partial \overline{Z}}{\partial k_{RW_3}} & \frac{\partial \overline{Z}}{\partial \Delta t_{RW}} & \frac{\partial \overline{Z}}{\partial k_{LW_1}} & \frac{\partial \overline{Z}}{\partial k_{LW_2}} & \frac{\partial \overline{Z}}{\partial k_{LW_3}} & \frac{\partial \overline{Z}}{\partial \Delta t_{LW}} \\ \frac{\partial \overline{RM}}{\partial k_{RW_1}} & \frac{\partial \overline{RM}}{\partial k_{RW_2}} & \frac{\partial \overline{RM}}{\partial k_{RW_3}} & \frac{\partial \overline{RM}}{\partial \Delta t_{RW}} & \frac{\partial \overline{RM}}{\partial k_{LW_1}} & \frac{\partial \overline{RM}}{\partial k_{LW_2}} & \frac{\partial \overline{RM}}{\partial k_{LW_3}} & \frac{\partial \overline{RM}}{\partial \Delta t_{LW}} \\ \frac{\partial \overline{PM}}{\partial k_{RW_1}} & \frac{\partial \overline{PM}}{\partial k_{RW_2}} & \frac{\partial \overline{PM}}{\partial k_{RW_3}} & \frac{\partial \overline{PM}}{\partial \Delta t_{RW}} & \frac{\partial \overline{PM}}{\partial k_{LW_1}} & \frac{\partial \overline{PM}}{\partial k_{LW_2}} & \frac{\partial \overline{PM}}{\partial k_{LW_3}} & \frac{\partial \overline{PM}}{\partial \Delta t_{LW}} \\ \frac{\partial \overline{YM}}{\partial k_{RW_1}} & \frac{\partial \overline{YM}}{\partial k_{RW_2}} & \frac{\partial \overline{YM}}{\partial k_{RW_3}} & \frac{\partial \overline{YM}}{\partial \Delta t_{RW}} & \frac{\partial \overline{YM}}{\partial k_{LW_1}} & \frac{\partial \overline{YM}}{\partial k_{LW_2}} & \frac{\partial \overline{YM}}{\partial k_{LW_3}} & \frac{\partial \overline{YM}}{\partial \Delta t_{LW}} \end{bmatrix}_{hover} \quad \text{Equation 8}$$

Analysis has shown that the quarter-cycle waveforms as described in this disclosure are effective at generating controllable values of the desired cycle averaged forces and moments, namely, $\overline{X}_{des}$, $\overline{Y}_{des}$, $\overline{Z}_{des}$, $\overline{RM}_{des}$, $\overline{PM}_{des}$, and $\overline{YM}_{des}$. With appropriate choices of vehicle parameters, the rank of the B matrix is six, thus indicating the ability to independently control six rigid body degrees of freedom using quarter-cycle constant period requency modulation.

Figure 8:
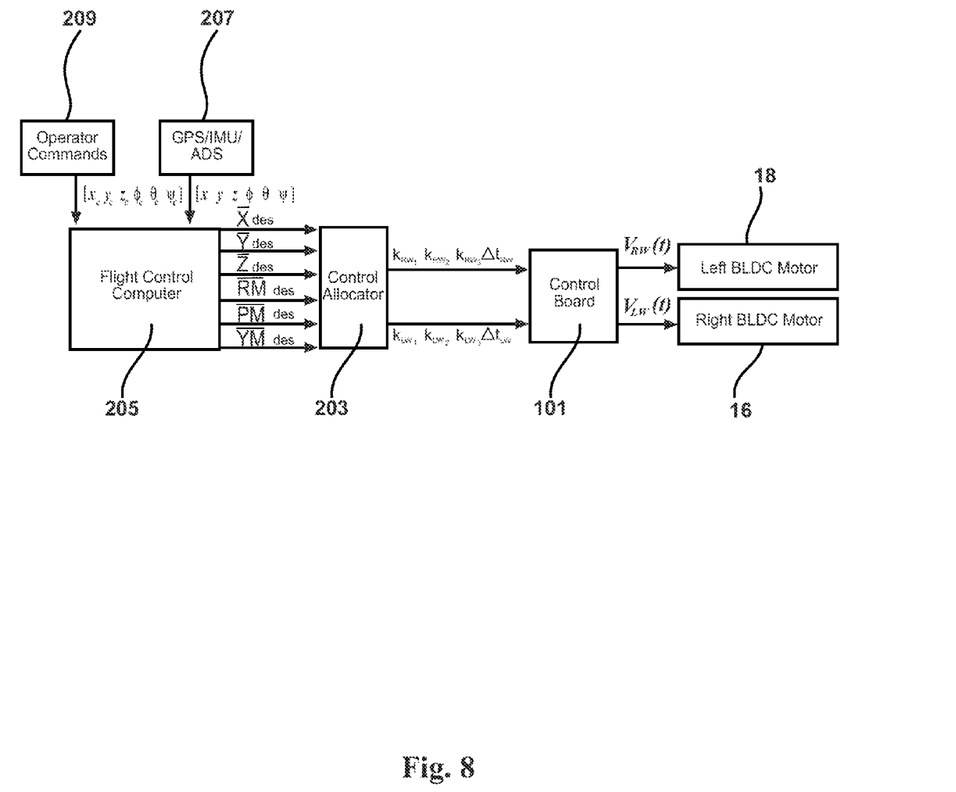
FIG. 8 is a block diagram depicting a flight control system using quarter-cycle waveform modulation in accordance with embodiments of the disclosed invention.

FIG. 8 shows a block diagram of the flight control system for the aircraft. An operator command processor 209 provides instantaneous values of the desired aircraft state to a flight control computer 205 in the form of inertial positions $x_c$, $y_c$, and $z_c$ and vehicle attitude, which can be expressed in Euler angles, $\phi_c$, $\theta_c$, and $\psi_c$. A sensor package 207 consisting of an inertial measurement unit, GPS receiver, and air data system, provides the actual position and orientation of the fuselage to said flight control computer. Said flight control computer compares the operator commands to the actual state of the aircraft and generates a vector of desired cycle-averaged force and moment commands $\overline{X}_{des}$, $\overline{Y}_{des}$, $\overline{Z}_{des}$, $\overline{RM}_{des}$, $\overline{PM}_{des}$, and $\overline{YM}_{des}$. The flight control laws in said flight control computer can be designed using any convenient method. The desired cycle averaged forces and moments are transformed into left and right wing waveform parameter commands by a control allocator 203. Said control allocator can be implemented using any number of techniques developed for control allocation. One method is computing the pseudo-inverse, $B^{\#}=(B^T B)^{-1} B^T$ of the control effectiveness matrix B in order to compute:

$$\begin{bmatrix} k_{RW_1} \\ k_{RW_2} \\ k_{RW_3} \\ \Delta t_{RW} \\ k_{LW_1} \\ k_{LW_2} \\ k_{LW_3} \\ \Delta t_{LW} \end{bmatrix} = B^{\#} \begin{bmatrix} \overline{X}_{des} \\ \overline{Y}_{des} \\ \overline{Z}_{des} \\ \overline{RM}_{des} \\ \overline{PM}_{des} \\ \overline{YM}_{des} \end{bmatrix} \quad \text{Equation 9}$$

The waveform parameters for the first wing planform 20 and second wing planform 22 that are generated by said control allocator form the input to control board 32. Inside control board 32 are two instantiations of waveform generator 399. The left wing waveform generator, contained within control board 32, supplies a time varying commutation signal to second BLDC motor 18 that ultimately creates the required flapping motion of second wing planform 22. The right wing waveform generator, contained within control board 32, supplies a time varying commutation signal to first BLDC motor 16 that ultimately creates the required flapping motion of first wing planform 20. Flapping planforms 20 and 22 generate aerodynamic forces and moments that cause the fuselage to be attracted to a desired position and attitude set point specified by said operator command processor.

Although the disclosed invention makes use of BLDC motors to impart motion to the flapping wings of the aircraft, other prime movers may be utilized. Linear electric motors or piezoelectric actuators coupled with gearing and linkages could be used to impart quarter-cycle motion to the wings of the aircraft. Furthermore, wingbeat amplitude modulation could be exchanged for frequency modulation. The control effectiveness matrix could be computed based on a constant wingbeat frequency that was tuned for a particular amplitude associated with quasi-hover. The wingbeat amplitude would then appear as a control input in the control effectiveness matrix and the control law would otherwise be implemented as described herein.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, or illustrative examples shown and described. Accordingly, departures may be made from such details without departing from the scope of the general inventive concept.

What is claimed is:

1. In an aircraft including a first wing planform and a second wing planform driven by a corresponding first actuator and a corresponding second actuator, wherein each of the first wing planform and the second wing planform performs an upstroke and a downstroke over a complete wingbeat cycle, a method of configuring a wing velocity profile, the method comprising:
    segmenting the complete wingbeat cycle into a set of quarter-strokes including a first quarter-stroke, a second quarter-stroke, a third quarter-stroke, and a fourth quarter-stroke;
    generating time-varying quarter-stroke wing position commands for each of the first and second wing planforms to produce wing flapping trajectories that generate non-zero, cycle averaged lift and drag forces and alter a cycle average center of pressure of each of the first and the second wing planforms relative to the aircraft;
    wherein the wing position commands include velocities and positions with temporally symmetric and asymmetric quarter-stroke components for the first wing planform and the second wing planform; and
    wherein the first wing planform and the second wing planform produce controlled six-degrees-of freedom vehicle motion without using actuators in excess of the first actuator and the second actuator.

2. The method of claim 1, wherein the temporally symmetric and asymmetric quarter-stroke components of the wing position commands are generated by combining a plurality of waveforms that are continuous over the complete wingbeat cycle of each of the first wing planform and the second wing planform.

3. The method of claim 2, wherein each of the plurality of waveforms is triangular.

* * * * *